(12) United States Patent
Chylinski et al.

(10) Patent No.: US 12,352,539 B2
(45) Date of Patent: Jul. 8, 2025

(54) AIRCRAFT WALL ASSEMBLY

(71) Applicant: B/E Aerospace (UK) Limited, Bedfordshire (GB)

(72) Inventors: Rafal Hubert Chylinski, Bristol (GB); Thomas James Pitts, Hanslope (GB); Swapnil Patil, Aylesbury (GB)

(73) Assignee: B/E Aerospace (UK) Limited, Bedfordshire (GB)

( * ) Notice: Subject to any disclaimer, the term of this patent is extended or adjusted under 35 U.S.C. 154(b) by 5 days.

(21) Appl. No.: 18/358,406

(22) Filed: Jul. 25, 2023

(65) Prior Publication Data
US 2024/0151499 A1    May 9, 2024

(30) Foreign Application Priority Data
Aug. 23, 2022    (EP) ..................... 22191800

(51) Int. Cl.
*F41H 5/00* (2006.01)
*B64D 7/00* (2006.01)
*B64F 5/10* (2017.01)
*F41H 5/007* (2006.01)
*F41H 5/04* (2006.01)

(52) U.S. Cl.
CPC .............. *F41H 5/007* (2013.01); *B64D 7/00* (2013.01); *B64F 5/10* (2017.01); *F41H 5/0485* (2013.01)

(58) Field of Classification Search
CPC ...... F41H 5/007; F41H 5/0485; F41H 5/0471; F41H 5/013; B64D 7/00; B64D 45/0015; B64F 5/10; B64C 1/10
See application file for complete search history.

(56) References Cited

U.S. PATENT DOCUMENTS

| | | | |
|---|---|---|---|
| 6,568,310 B2 | 5/2003 | Morgan | |
| 9,279,641 B1 * | 3/2016 | Springsteen | .......... F41H 5/0471 |
| 2003/0114064 A1 | 6/2003 | Fu et al. | |
| 2006/0145009 A1 * | 7/2006 | Shockey | ................... F41H 7/00 89/36.11 |
| 2014/0238224 A1 * | 8/2014 | Bird | ...................... F41H 5/0457 89/36.02 |
| 2018/0072423 A1 * | 3/2018 | Vélez De Mendizábal Alonso et al. | ..................... F41H 5/0471 |
| 2020/0385122 A1 | 12/2020 | Burd et al. | |

FOREIGN PATENT DOCUMENTS

| | | |
|---|---|---|
| DE | 102020210037 | 2/2022 |
| EP | 3296194 | 3/2018 |
| WO | 2021144383 | 7/2021 |

OTHER PUBLICATIONS

EPO, Extended European Search Report dated Feb. 9, 2023 with EP Serial No. 22191800.6.

\* cited by examiner

*Primary Examiner* — Valentina Xavier
(74) *Attorney, Agent, or Firm* — SNELL & WILMER L.L.P.

(57) ABSTRACT

An aircraft wall assembly comprises a panel comprising a ballistic protection layer configured to deform to absorb energy during a projectile impact; and a barrier, wherein the ballistic protection layer comprises a constrained portion, wherein deformation of the ballistic protection layer is constrained at the constrained portion such that the energy absorbed by the constrained portion during the projectile impact is reduced; wherein the barrier is configured to deflect projectile material that passes through the constrained portion of the panel during the projectile impact.

15 Claims, 1 Drawing Sheet

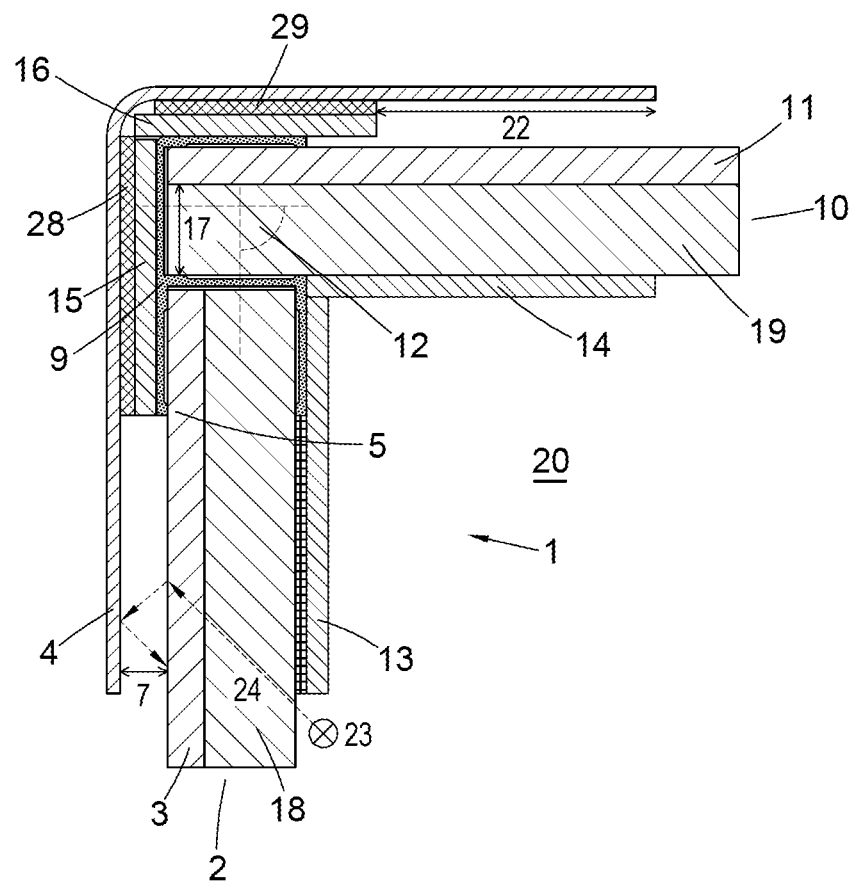

AIRCRAFT WALL ASSEMBLY

CROSS-REFERENCE TO RELATED APPLICATIONS

This application claims priority to, and the benefit of, EP Patent Application No. 22191800.6, filed Aug. 23, 2022 and titled "AIRCRAFT WALL ASSEMBLY," which is incorporated by reference herein in its entirety for all purposes.

FIELD

The invention relates to aircraft wall assemblies, aircraft and methods of manufacturing an aircraft wall assembly.

BACKGROUND

In aviation, critical areas such as aircraft cockpits need to be protected against penetration from ballistics or projectiles. This may be achieved by providing panels comprising ballistic protection material, which may deform to absorb the kinetic energy from a projectile during a projectile impact onto a cockpit wall. However, in order to increase the usable space in an aircraft, aircraft manufacturers seek to implement cockpit walls that have complex geometric shapes, which present challenges to providing ballistic protection.

SUMMARY

In a first aspect, there is provided an aircraft wall assembly comprising a panel and a barrier. The panel comprises a ballistic protection layer configured to deform to absorb energy during a projectile impact. The ballistic protection layer comprises a constrained portion, wherein deformation of the ballistic protection layer at the constrained portion is constrained such that the energy absorbed by the constrained portion during the projectile impact is reduced. The barrier is configured to deflect projectile material that passes through the constrained portion of the panel during the projectile impact.

A portion of the ballistic protection layer may become constrained in an area where, for example, a fixing is used to fix the panel to an additional panel to achieve a more complex geometric shape. In these areas the ability of the ballistic protection layer to deform is reduced, reducing energy absorption during a projectile impact (e.g. during impact of a bullet fired from a cabin to a cockpit) and increasing the likelihood of tearing of the ballistic protection layer, thus making the panel less effective in providing ballistic protection and unable to meet regulatory requirements. By providing a barrier as described, ballistic protection panels can be assembled into geometrically complex shapes, whilst maintaining the required level of ballistic protection and meeting the regulatory requirements, with projectile material being deflected away from critical areas.

In some examples, the barrier is positioned such that there is a gap between the panel and the barrier. In some examples, the gap is larger than 5 mm. In some examples, the gap is larger than 6 mm. In some examples, the gap is larger than 6.5 mm, In some examples, the gap is 6.7 mm. A gap between the barrier and the ballistic protection layer may provide a volume into which the ballistic protection layer can deform, reducing constraining of the ballistic protection layer.

In some examples, the barrier is configured to deflect the projectile material such that the projectile material is caught by the aircraft wall assembly.

In some examples, the barrier is configured to deflect the projectile material back into the ballistic protection layer. Deflecting the projectile material back into the ballistic protection layer may be a safe means of bringing the projectile material to rest.

In some examples, the barrier is configured to deflect the projectile material away from the constrained portion of the ballistic protection layer. Deflecting the projectile material away from the constrained portion of the ballistic protection layer may reduce the likelihood of the projectile material passing back through the ballistic protection layer.

In some examples, the barrier is substantially parallel to the panel.

In some examples, the barrier covers at least the constrained portion of the panel.

In some examples, the assembly comprises an additional panel comprising an additional ballistic protection layer. In some examples, the additional panel is angled relative to the panel. In some examples, the additional panel is substantially normal to the panel. The additional panel may permit more complex geometries to be achieved e.g. using easy to manufacture substantially planar panels.

In some examples, the assembly comprises a fixing member, wherein the fixing member applies a force to the panel, the force constraining the ballistic protection layer at the constrained portion.

In some examples, the barrier extends beyond the fixing member along the panel by a distance of more than 25 mm. In some examples, the barrier extends beyond the fixing member along the panel by a distance of more than 30 mm. In some examples, the barrier extends beyond the fixing member along the panel by substantially 35 mm.

In some examples, the fixing member comprises one or more reinforcement components configured to cover a gap between the ballistic protection layers of the panel and the additional panel.

In some examples, the aircraft wall assembly comprises a reinforcement component, the reinforcement component covering a protection gap, wherein the protection gap is a gap between ballistic protection components in which ballistic protection is reduced.

In some examples, the reinforcement component is configured to apply a force to the panel, the force constraining the ballistic protection layer at the constrained portion.

In some examples, the aircraft wall assembly comprises a plurality of reinforcement components, the reinforcement components together covering the protection gap.

In some examples, the one or more reinforcement components are made from metal.

In some examples, the panel comprises a structural layer configured to provide structural support to the panel.

In some examples, the ballistic protection layer is made from fibrous material. In some examples, the barrier is made from metal. Fibrous material may provide lightweight and effective means of energy absorption. A barrier made from metal may provide an effective deflecting component.

In a second aspect, there is provided an aircraft comprising the aircraft wall assembly of the first aspect.

In a third aspect, there is provided a method of manufacturing an aircraft wall assembly, the method comprising providing a panel comprising a ballistic protection layer, the ballistic protection layer configured to deform to absorb energy during a projectile impact; constraining a portion of the ballistic protection layer such that the energy absorbed by the constrained portion during the projectile impact is reduced; and attaching a barrier to the panel to deflect projectile material that passes through the constrained portion of the panel during the projectile impact.

The aircraft of the second aspect may comprise any of the features of the examples described with respect to the first aspect. The method of the third aspect may include any functional steps described in relation to the examples of the first aspect.

BRIEF DESCRIPTION OF THE DRAWINGS

Various examples will now be described with reference to the accompanying drawing in which:

FIG. 1 shows a cross-sectional view of an aircraft wall assembly.

DETAILED DESCRIPTION

With reference to FIG. 1, an aircraft wall assembly 1 comprises a panel 2 and an additional panel 10. The aircraft wall assembly 1 separates a cabin 20 from a cockpit 21.

The panel 2 comprises a first ballistic protection layer 3 and a first structural layer 18. The first ballistic protection layer 3 is made from fibrous material (e.g. Kevlar) that is woven together to form a ballistic protection layer.

The first ballistic protection layer 3 is attached to the first structural layer 18 by double sided elastic tape. Using double sided elastic tape allows for deflection of the tape whilst still holding the materials together. The inventors have found that this is advantageous when compared to, for example, using a brittle adhesive such as an epoxy. This is because a brittle adhesive may not be able to deflect whilst still holding the materials together.

The first structural layer 18 is a sandwich panel which comprises two outer layers of glass-fibre pre-preg laminate and a honeycomb nomex core. The first structural layer 18 provides structural support to the panel 2. The first structural layer 18 provides rigidity to the panel 2.

The additional panel 10 comprises a second ballistic protection layer 11 and a second structural layer 19. The second ballistic protection layer 11 and structural layer 19 are formed of the same materials, have the same functions and are fixed together in the same manner as the first ballistic protection layer 3 and first structural layer 18.

The panel 2 is fixed to the additional panel 10 by a fixing member 9. The fixing member 9 is made from metal. The fixing member 9 provides a means to hold the panel 2 in position relative to the additional panel 10. The fixing member 9 receives an edge of each of the panel 2 and the additional panel 10 to fix the panel 2 relative to the additional panel 10. The fixing member 2 fixes the edge of each of the panel 2 and the additional panel 10 using an adhesive. The fixing member 9 reduces the deformability of the panels 2, 10 in the area around the fixing member 9 because of its rigidity. As a result, the fixing member 9 constrains the deformation of the ballistic protection layers 3, 11 in the area around the fixing member 9. In other examples, the fixing member 9 clamps the panels 2, 10 further reducing the deformability of panels 2, 10.

The panel 2 and the additional panel 10 are fixed to each other at a fixing angle 12, such that the panel 2 and the additional panel 10 are not parallel to each other. The fixing angle 12 is approximately 90 degrees. The aircraft wall assembly 1 provides a corner assembly.

The corner assembly presents a concave surface to the cabin 20. The corner assembly presents a convex surface to the cockpit 21. Each of the panel 2 and the additional panel 10 presents a substantially planar face to the cabin 20. Each of the panel 2 and the additional panel 10 presents a substantially planar face to the cockpit 21. The first and second structure layers 18, 19 are closer to the cabin 20 than the first and second ballistic protection layers 3, 11.

A protection gap 17 forms between the ballistic protection layers 3, 11. In the present example, this is due to the arrangement of the panels 2, 10 (which are angled relative to each other) and the layered structures of the panels 2, 10. The protection gap 17 is a break in the ballistic protection in the corner of the aircraft wall assembly 1. The protection gap 17 may provide a direct, linear path through the aircraft wall assembly 1 which does not pass through any ballistic protection. This may permit a projectile to travel from a cabin 20 to a cockpit 21 of the aircraft.

The aircraft wall assembly 1 comprises first, second, third and fourth reinforcement components 13, 14, 15, 16. The reinforcement components 13, 14, 15, 16 are formed of a substantially rigid material. The reinforcement components 13, 14, 15, 16 are formed of ballistic steel. The reinforcement components 13, 14, 15, 16 are substantially planar. The reinforcement components 13, 14 are bonded to the fixing member 9 using double-sided elastic tape. The reinforcement components 15, 16 are fixed to the fixing member 9 using mechanical fasteners which apply a clamping force to the panels 2, 10. The mechanical fasteners apply a clamping force to the ballistic protection layers 3, 11.

The reinforcement components 13, 14, 15, 16 cover the protection gap 17, such that there is no direct, linear path through the aircraft wall assembly 1 which does not pass through ballistic protection or a reinforcement component.

The first reinforcement component 13 covers a portion of the panel 2 on a cabin side of the panel 2. The first reinforcement component 13 extends from an inside edge of the corner assembly along a cabin side face of the panel 2.

The second reinforcement component 14 covers a portion of the additional panel 10 on a cabin side of the additional panel 10. The second reinforcement component 14 extends from the inside edge of the corner assembly along a cabin side face of the additional panel 10. The second reinforcement component 14 abuts the first reinforcement component 13 at the inside edge of the corner assembly.

The third reinforcement component 15 covers a portion of the panel 2 on a cockpit side of the panel 2. The third reinforcement component 15 extends from an outside edge of the corner assembly along a cockpit side face of the panel 2. The third reinforcement component 15 extends from the outside edge of the corner assembly along an edge of the additional panel 10.

The fourth reinforcement component 16 covers a portion of the additional panel 10 on a cockpit side of the additional panel 10. The fourth reinforcement component 16 extends from the outside edge of the corner assembly along a cockpit side face of the additional panel 10. The third reinforcement component 15 abuts the fourth reinforcement component 16 at the outside edge.

As mentioned above, the reinforcement components 15, 16 apply a clamping force to the first and second ballistic protection layers 3, 11. The fixing member 9 also reduces deformation of the ballistic protection layers 3, 11, resulting in a constrained portion in the ballistic protection layers 3, 11.

The clamping force is applied to the first and second ballistic protection layers 3, 11. The clamping force results in a constrained portion 5 of the first ballistic protection layer 3. In the constrained portion 5, the ability of the fibres in the first ballistic protection layer 3 to deform is reduced. In this example, the ability of the fibres in the first ballistic protection layer 3 to deform is reduced by the clamping force. It will be understood that the constrained portion 5 extends beyond the portion of the panel 3 that is received inside the fixing member 9. This is because deformation of the fibres is constrained beyond the region of the panel that is directly held by the fixing member 9 or clamped by the reinforcement components 15, 16.

Deformation of the fibres is fully constrained in the region around the fixing member 9 and in the region around the reinforcement components 15, 16. Deformation of the fibres is partially constrained in the region 22 which is between the ballistic protection layers 3, 11 and a barrier 4.

Because the ability of the fibres to deform is reduced in the constrained portion 5, the energy they can absorb during a projectile impact is reduced relative to an unconstrained ballistic protection layer. This increases the likelihood of projectile material passing from the cabin 20 to the cockpit 21.

In particular, the likelihood of projectile material passing from the cabin 20 to the cockpit 21 is increased if a projectile 23 is incident upon the wall assembly 1 along a vulnerable path 24. The vulnerable path 24 enters the panel 2 adjacent to the first reinforcement component 13. The vulnerable path 24 is angled relative to a direction normal to the panel 2. The vulnerable path 24 passes into the first ballistic protection layer 3 in the constrained portion 5.

The aircraft wall assembly 1 comprises the barrier 4. The barrier 4 is configured to deflect projectile material (e.g. a projectile or fragments of a projectile) that passes through the constrained portion 5. The barrier 4 is formed of a sheet. The barrier 4 is formed of stainless steel or aluminum.

The barrier 4 is fixed to the third and fourth reinforcement components 15, 16 by the mechanical fastener (not shown) which applies a clamping force. Between the barrier 4 and the third reinforcement component 15 is a silicone elastomer sheet 28. Between the barrier 4 and the fourth reinforcement component 16 is a silicone elastomer sheet 29. The silicone elastomer sheets 28, 29 offset the barrier 4 from the panels 2, 10 as will be described further on.

The barrier 4 extends across a cockpit side of the panel 2. The barrier 4 covers the constrained portion 5. The barrier 4 extends around the outside of the corner assembly. The barrier 4 also covers the constrained portion of the second ballistic layer 11. The barrier 4 extends a distance 22 beyond the fixing member 9.

The barrier 4 is offset from the panel 2 by a gap 7. The gap 7 provides a volume into which the ballistic protection layer 3 can deform during a projectile impact. As a result of the gap 7, the barrier 4 only partially constrains the first ballistic protection layer 3. Where the barrier 4 covers the constrained portion 5, the barrier 4 is substantially parallel to the panel 2. The barrier 4 is offset from the panel 2 by the silicone elastomer sheets 28, 29. The silicone elastomer sheets 28, 29 are dimensioned and positioned such that the gap 7 is 6.7 mm. The barrier 4 extends beyond the fixing member 9 along the panel 2 by a distance 22. The inventors have found that a distance 22 of greater than or equal to 25 mm effectively deflects projectile material, and in the present example the distance 22 is 35 mm.

In the event of the projectile 23 (e.g. a bullet from a firearm) being incident on the aircraft wall assembly 1 along the vulnerable path, the projectile 23 passes through the first structural layer 18 and enters the first ballistic protection layer 3 in the constrained portion 5. The first ballistic protection layer 3 deforms to absorb some of the projectile's kinetic energy, reducing the velocity of the projectile 23. However, because the ability of the first ballistic protection layer 3 to deform in the constrained portion 5 is reduced, projectile material (e.g. the projectile 23 or fragments of the projectile 23 which may form due to the projectile breaking up while passing through the panel 2) passes through the first ballistic protection layer 3.

The barrier 4 deflects the projectile material back into the first ballistic protection layer 3. The first ballistic protection layer 3 catches the projectile material, such that the projectile material comes to rest and is held by the first ballistic protection layer 3. The barrier 4 deflects the projectile material into the first ballistic protection layer 3 at a point on the first ballistic protection layer 3 which is less constrained than at the vulnerable path 24.

The first ballistic protection layer 3 thus deforms again to absorb the kinetic energy of the projectile material and to bring the projectile material to rest in the first ballistic protection layer 3. The barrier 4 thereby catches the projectile material that has passed through the constrained portion 5.

While the description herein relates to the panel 2, it will be understood that it also applies to the additional panel 10, which also comprises a constrained portion that is covered by the barrier 4. The barrier 4 is configured to deflect projectile material from both the panel 2 and the additional panel 10.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. An aircraft wall assembly, comprising:
a panel comprising a ballistic protection layer configured to deform to absorb energy during a projectile impact; and
a barrier;
wherein the ballistic protection layer comprises a constrained portion, wherein deformation of the ballistic protection layer at the constrained portion is constrained such that the energy absorbed by the constrained portion during the projectile impact is reduced,
wherein the barrier is configured to deflect projectile material that passes through the constrained portion of the panel during the projectile impact.

2. The aircraft wall assembly according to claim 1, wherein the barrier is positioned such that there is a gap between the panel and the barrier.

3. The aircraft wall assembly according to claim 2, wherein the gap has a width of: ≥5 mm; or ≥6 mm; or ≥6.5 mm; or substantially 6.7 mm.

4. The aircraft wall assembly according to claim 1, wherein the barrier is configured to deflect the projectile material such that the projectile material is caught by the aircraft wall assembly.

5. The aircraft wall assembly according to claim 4, wherein the barrier is configured to deflect the projectile material back into the ballistic protection layer.

6. The aircraft wall assembly according to claim 4, wherein the barrier is configured to deflect the projectile material away from the constrained portion of the ballistic protection layer.

7. The aircraft wall assembly according to claim 4, wherein the barrier is substantially parallel to the panel.

8. The aircraft wall assembly according to claim 1 and comprising an additional panel comprising an additional ballistic protection layer.

9. The aircraft wall assembly according to claim 8, wherein the additional panel is angled relative to the panel.

10. The aircraft wall assembly according to claim 1 and comprising a fixing member, wherein the fixing member is configured to apply a force to the panel, the force constraining the ballistic protection layer at the constrained portion.

11. The aircraft wall assembly according to claim 10, wherein the barrier extends beyond the fixing member along the panel by a distance of ≥25 mm; or substantially 35 mm.

12. The aircraft wall assembly according to claim 1 and comprising a reinforcement component, the reinforcement component covering a protection gap, wherein the protection gap is a gap between ballistic protection components in which ballistic protection is reduced.

13. The aircraft wall assembly according to claim 12, wherein the reinforcement component is configured to apply a force to the panel, the force constraining the ballistic protection layer at the constrained portion.

14. The aircraft comprising the aircraft wall assembly of claim 1.

15. A method of manufacturing an aircraft wall assembly, the method comprising:
  providing a panel comprising a ballistic protection layer, the ballistic protection layer configured to deform to absorb energy during a projectile impact;
  constraining a portion of the ballistic protection layer such that the energy absorbed by the constrained portion during the projectile impact is reduced; and
  attaching a barrier to the panel to deflect projectile material that passes through the constrained portion of the panel during the projectile impact.

* * * * *